April 6, 1926. 1,579,740
F. J. THORLING
MACHINE SUITABLE FOR BREAD CUTTING AND BUTTERING
Filed Feb. 14, 1923  2 Sheets-Sheet 1

Inventor
F.J.Thorling
By Marks & Clerk
Attys.

April 6, 1926. 1,579,740
F. J. THORLING
MACHINE SUITABLE FOR BREAD CUTTING AND BUTTERING
Filed Feb. 14, 1923 2 Sheets-Sheet 2

Inventor
F. J. Thorling
By Marko Clerk
Attys.

Patented Apr. 6, 1926.

1,579,740

UNITED STATES PATENT OFFICE.

FREDERICK JAMES THORLING, OF ILFORD, ENGLAND, ASSIGNOR OF ONE-HALF TO THE B. AND B. MACHINE COMPANY LIMITED, OF LONDON, ENGLAND.

MACHINE SUITABLE FOR BREAD CUTTING AND BUTTERING.

Application filed February 14, 1923. Serial No. 619,009.

*To all whom it may concern:*

Be it known that I, FREDERICK JAMES THORLING, a subject of the King of Great Britain and Ireland, and residing at 47 Jersey Road, Ilford, in the county of Essex, England, have invented certain new and useful Improvements in Machines Suitable for Bread Cutting and Buttering, of which the following is a specification.

The present invention relates to an improved machine suitable for spreading butter, jam, potted meat and the like substances upon bread, and cutting bread into slices.

In the types of bread-cutting and buttering machines hitherto proposed there has been some difficulty in causing the butter to be spread evenly over the surface of bread of various textures and also in cutting thin slices of bread when this has not been long out of the oven. The former difficulty has been overcome to a certain extent by the use of spreading plates having apertures therein of such form as has been found by experiment to be most desirable.

The object of the present invention is to overcome these difficuties in a novel manner, though in certain circumstances perforated plates as described in British patent specifications, Nos. 4217 of 1912 and 105133, may with advantage be adopted in the present case.

The present invention consists in a machine which will cut bread of all textures into thin slices and spread material thereon in an even manner.

The invention also consists in the features hereinafter described in the specification and claimed in the claims at the end thereof.

In order that the carrying of the invention into effect may be understood, reference will now be made to the accompanying drawings, in which:—

In carrying the invention into effect in one form, the bread is held in a carrier, A, movably mounted at the end of a lever or arm, B, which is in turn supported on a pivot, C, attached to the bed, D, of the machine. A driving gear is provided of such a type as may according to circumstances be either hand or power driven.

Figure 2:
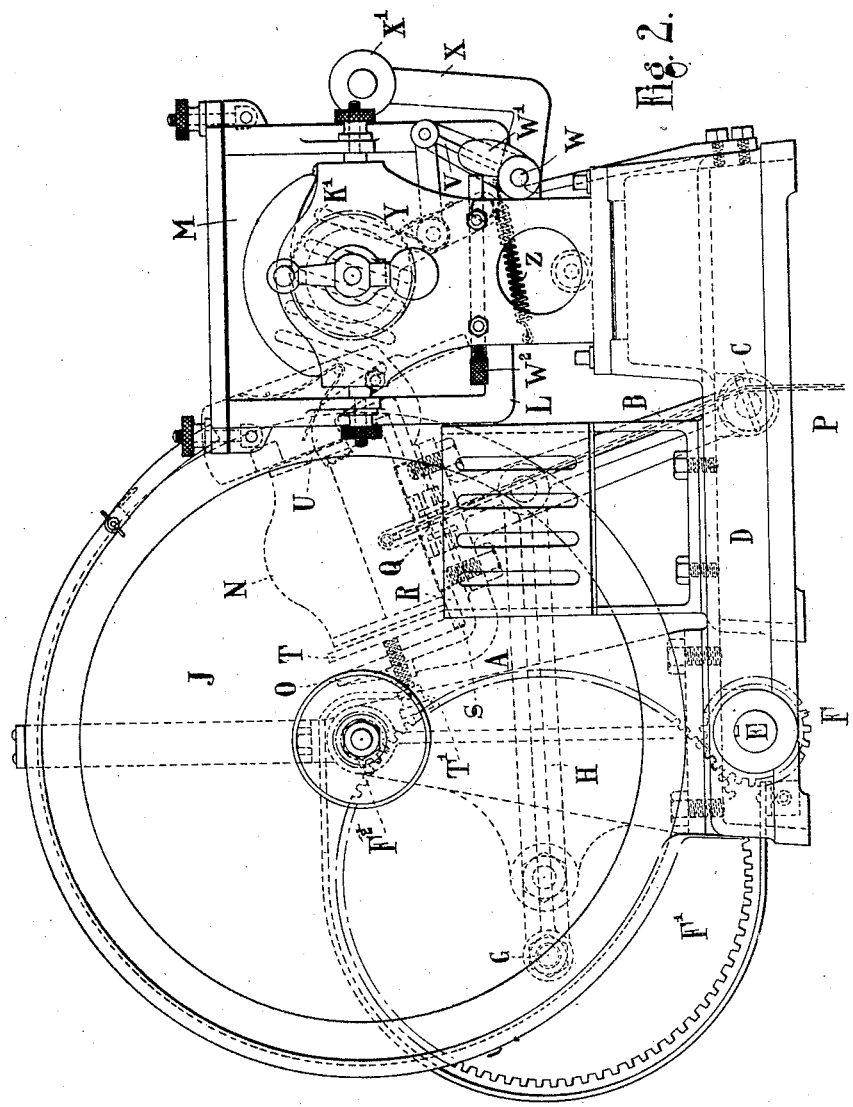
Figure 2 is an end view of the complete machine.

In the present instance the driving means operate directly on shaft, E, (Figure 2) and through the gears, F, $F_1$, rotate the crank pin, G, and thereby oscillate the pivoted arm, B, through the medium of the link, H. The gear, $F_1$, meshes with another gear or pinion, $F_2$, which is suitably fastened to the blade or cutter J. The gearing is so arranged that the circular cutting blade, J, is rotated at a high speed of revolution. The cutting edge of the blade may be elliptical or irregular in shape or may be serrated on its edge, or take the contour of a scimitar.

Figure 1:
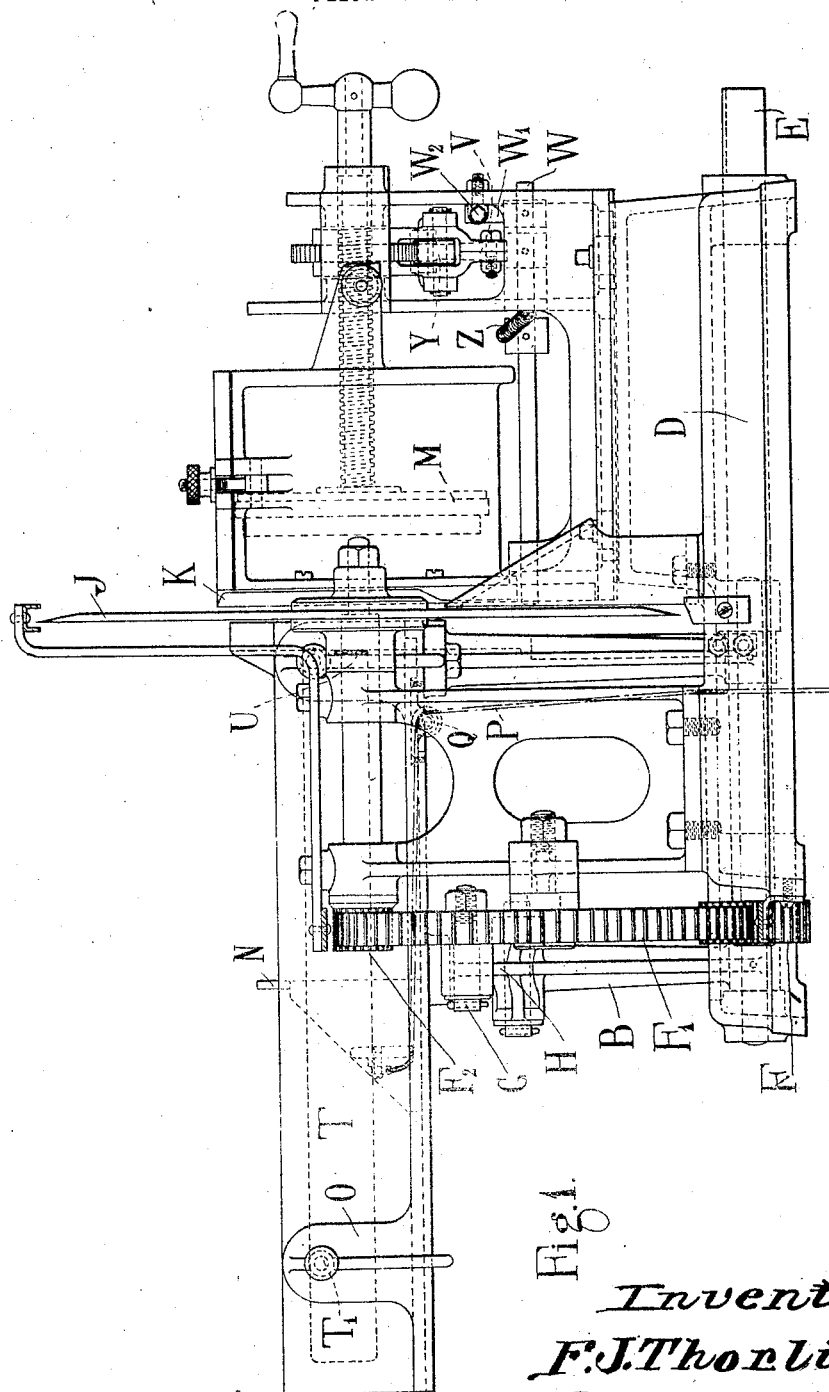
Figure 1 is a side elevation.

As the bread is moved "forward" it wipes against a spreading plate, K, which is suitably mounted in the end of the butter receptacle, L. This receptacle is provided with a piston, M, (Figure 1) of known form and operated in such a manner that the butter is caused to exude through the perforations in the spreading plate, K, in any predetermined quantity. The perforations, $K_1$, in the spreading plate, K, may be of any convenient form. Care should be taken that the slots or perforations, $K_1$, as the case may be, are of a form which will tend to spread the butter or other substance evenly over the surface of the bread.

If desired the spreading plate, K, may be rotatably or otherwise suitably mounted in the end of the butter receptacle so that provision is made for increasing the area over which the butter may be spread.

More than one plate may be used if desired and means may be arranged to cut off the butter supply, or to otherwise regulate the same. Where desired a uniform consistency in the butter or other matter in the receptacle may be obtained by adding an ice or cold water jacket thereto for warm climates, or any suitable means for applying heat in cold climates. Such means for applying heat may be of a suitably adapted form of the device described in British patent specification No. 105133, or a hot air device which, for example, may be arranged by providing passageways between the rows of perforations or slots in the spreading plate and connecting the same to an external source of heat, the heat of course being caused to circulate through the said passageways.

Where the spreading plate is adapted to be rotated, suitable connecting passages can be arranged in the casing so that in whatever position the spreading plate may be the circulation of the hot air is unimpeded.

Means for mechanically feeding the bread forward after a buttered slice has been cut therefrom are provided together with means for mechanically operating the piston of the butter receptacle so that the supply of substance to be spread may be constant or approximately so.

The bread feeding device comprises a pressure plate, N, working within a trough-form structure, O, mounted on the pivoted arm, B. The pressure plate bears on the end of the loaf and the latter is fed forward by a weight suspended upon a chain, P, which passes over a pulley, Q, placed in a suitable position. If desired a spring or other suitable means may be used in lieu of the gravity feed above described. The pressure plate, N, is mounted on a base plate, R, sliding within slots or grooves, S, in the side walls of the trough-like structure, O. To provide for the accommodation of loaves of varying size an adjustable side plate, T, and controlling screw device are arranged on a convenient side of the bread carrier. A spring controlled pivoted lever, U, having a serrated edge for engaging with the bread is arranged to hold the loaf in position during the cutting operation. The loaf is released when opposite the butter receptacle by the said spring controlled lever, U, engaging with a suitable trip gear. The loaf then, owing to the movement of the bread carrier, bears on and wipes the spreading plate of the butter receptacle and finally approaches the knife, J, when a slice of predetermined thickness is cut off.

A lever and link device is provided for the operation of the piston in the butter receptacle, together with any known means of adjustment. The lever, V, of the piston feed device is mounted upon a rocking shaft, W, which carries a lever, X, and roller $X_1$, which contacts with the bread carrier after the bread has first passed across the face of the spreading plate. Thus it will be seen that when contact occurs the rocking shaft, W, is partially rotated and carries the lever, V, of the piston feed with it, which in turn, through the medium of suitable mechanism such as the well known pawl and ratchet device, Y, shown in the drawings, causes the piston to be fed forward and cause a certain amount of butter to exude through the perforations in the spreading plate for each new surface of bread to be buttered.

The aforesaid rocking shaft, W, is controlled by the spring, Z, and is arranged to allow the member, $W_1$, to bear upon the end of the adjusting screw, $W_2$, the manipulation of which controls the quantity of butter or the like applied to a slice.

It is conceivable that in an alternative arrangement of the machine the spreading plate may be caused to partially rotate during the buttering operation, such a motion forming an additional safeguard against the possibility of the butter lying unevenly upon the surface of the bread.

Having now described my invention, what I claim as new and desire to secure by Letters Patent is:—

1. In a machine for cutting bread, the combination comprising a rotary knife, a pivotally mounted bread carrier and means for oscillating said bread carrier to and from said knife.

2. In a machine for cutting bread and spreading material thereon, the combination comprising a rotary knife, a pivotally mounted bread carrier and means for oscillating said bread carrier to and from said knife.

3. In a machine for cutting bread and spreading material thereon, the combination comprising a rotary knife, a receptacle for the spreadable material situated in the plane of rotation of said knife, perforations in said receptacle through which the spreadable material exudes, a pivotally mounted bread carrier and means for oscillating said bread carrier from the receptacle to the knife, said movement applying the spreadable material to the bread before the cutting operation.

4. In a machine for cutting bread and spreading material thereon having a frame, a rotary knife and a receptacle for the spreading material, the combination comprising a support pivotally mounted upon said frame, a bread carrier mounted upon said support and means for oscillating said support together with said bread carrier to and from said knife.

5. In a machine for cutting bread and spreading material thereon, the combination comprising a rotary knife, a pivotally mounted bread carrier, means for oscillating said bread carried to and from said knife and means operated by gravity for feeding the bread.

6. In a machine for cutting bread and spreading material thereon having a frame, a rotary knife, a receptacle for the spreadable material, and means for rotating said knife, the combination comprising a pivotally mounted bread carrier, means for oscillating said bread carrier in a plane parallel to the plane of rotation of the said rotary knife, means for feeding said bread in a direction at right angles to the plane of rotation of said knife through the intermediary of a weight and automatic means for alternately clamping and releasing the bread during the cutting and feeding operations.

7. In a machine for cutting bread and spreading material thereon having a frame, a rotary knife, a receptacle for the spreadable material, and means for rotating said knife, the combination comprising a pivotally mounted bread carrier, means for oscillating said bread carrier from the knife to the receptacle and back, and means for feeding the bread when opposite said receptacle so that the movement of the bread from the receptacle to the knife spreads the material on said bread.

8. In a machine for cutting bread and spreading material thereon, the combination comprising a rotary knife, a receptacle for the spreading material, a pivotally mounted bread carrier, and means for oscillating said bread carrier to and from said knife and past said receptacle.

9. In a machine for cutting bread, the combination comprising a rotary knife, a pivotally mounted bread carrier, a receptacle for spreading material, and means for oscillating said bread carrier to and from said knife and across said receptacle.

10. In a machine for cutting bread and spreading material thereon, the combination comprising a rotary knife, a receptacle for spreading material, a pivotally mounted bread carrier, means for oscillating said bread carrier to and from said knife and past and in contact with said receptacle, and means operated by gravity for feeding the bread.

In testimony whereof I have signed my name to this specification.

FREDERICK JAMES THORLING.